Patented Feb. 28, 1928.

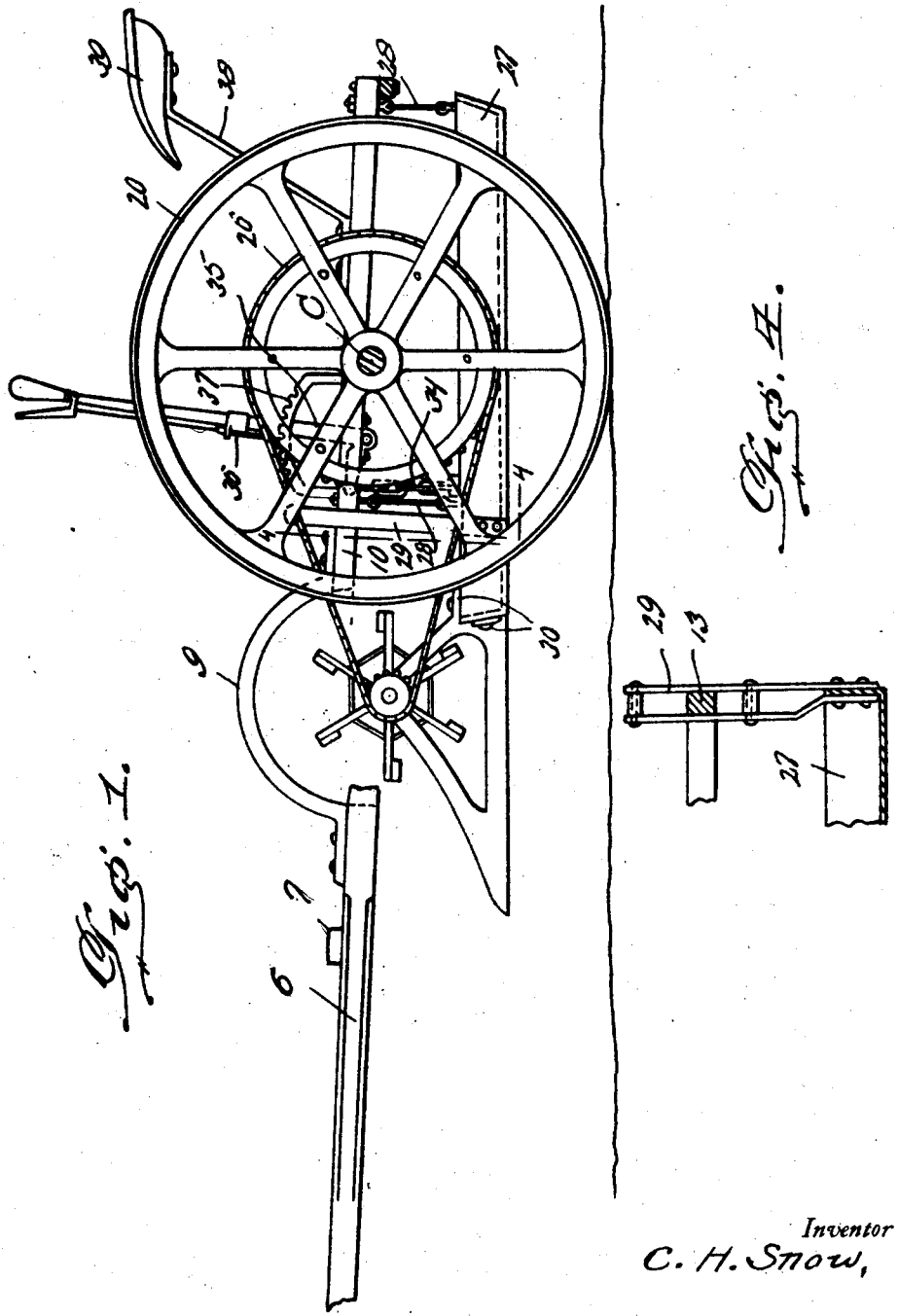

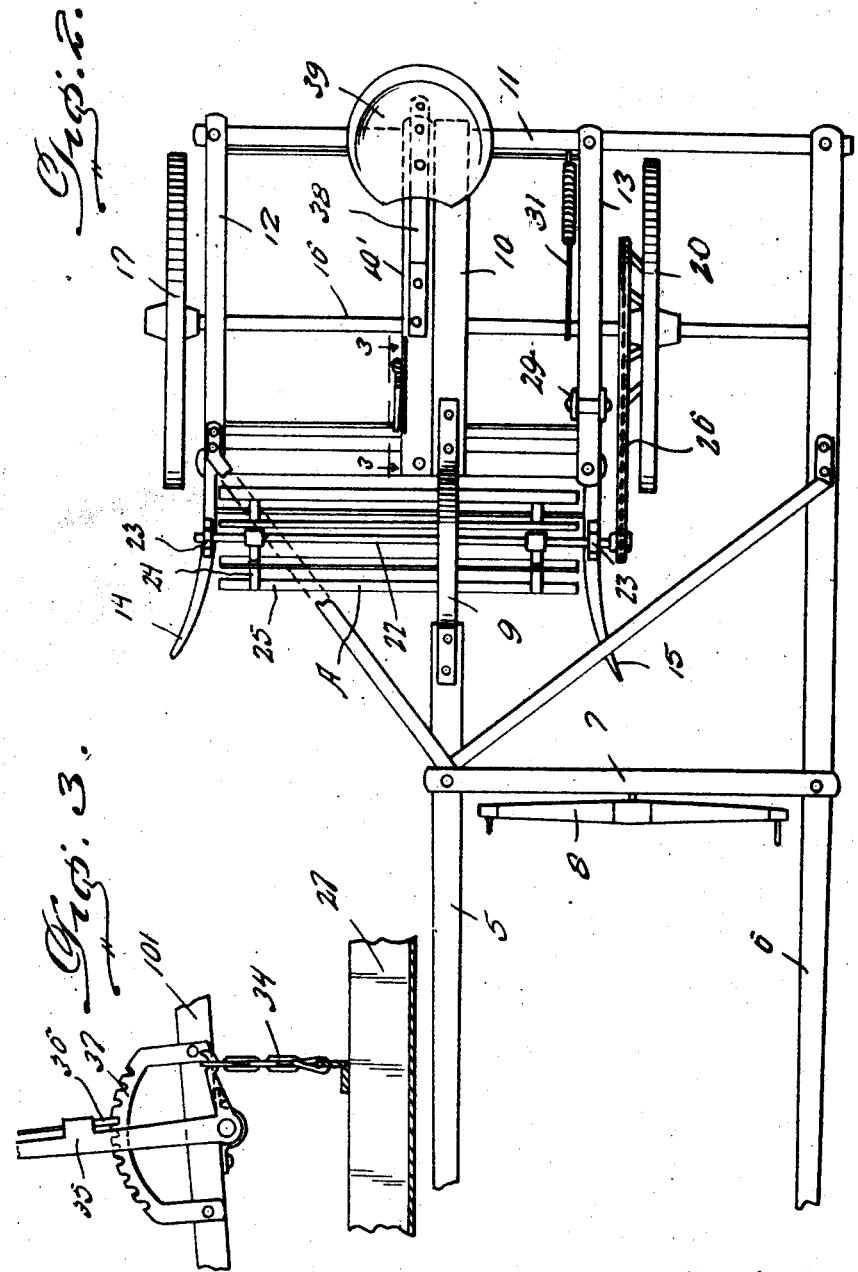

UNITED STATES PATENT OFFICE.

CLIFFORD H. SNOW, OF FERRON, UTAH.

BOLL-WEEVIL COLLECTOR.

Application filed September 13, 1927. Serial No. 219,262.

The present invention relates to a machine for collecting boll weevils from plants and the like and has for its prime object to provide a wheeled structure having mechanism mounted thereon driven by the motion of the apparatus for knocking boll weevil worms from plants and collecting them into a suitable receptacle.

Another important object of the invention resides in the provision of a structure of this nature wherein the parts are arranged in a compact and convenient manner and permit ready adjustment and manipulation.

A further important object of the invention resides in the provision of a boll weevil collecting apparatus of this nature which is simple in its construction, inexpensive to manufacture, strong and durable, thoroughly efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of the apparatus partly in section embodying the features of my invention, Figure 2 is a top plan view thereof, Figure 3 is an enlarged detail sectional view taken substantially on the line 3—3 of Figure 2, and, Figure 4 is an enlarged detail sectional view taken substantially on the line 4—4 of Figure 1.

Referring to the drawing in detail it will be seen that the numerals 5 and 6 denote animal shafts of any suitable formation except that the latter is longer at its rear end than the former. A cross member 7 connects the shafts 5 and 6 and has engaged therewith a conventional whiffletree structure 8. An arcuate bar 9 has one end attached to the rear end of the shaft 5 to extend rearwardly therefrom with its intermediate portion curved upwardly. A bar 10 is connected to the rear end of the bar 9 and extends in alinement with the shaft 5. A rear frame bar 11 is engaged with the rear end of the shaft 6 and the rear end of the bar 10. Side bars 12 and 13 project forwardly from the rear frame bar 11 one to each side of the bar 10. An axle shaft 16 is journaled under the shaft 6 and bars 13, 10 and 12, and has fixed to one end a wheel 17 just outside of the side bars 12 and another wheel 20 fixed to an intermediate portion just outside of the side bar 13, but inside of the shaft 6. A beater drum A is journaled between guide bars 14 and 15 which are curved forwardly and outwardly. This beater drum comprises a shaft 22 journaled in bearings 23 with spoke structures 24 radiating therefrom and supporting beater bars 25 extending in parallelism with the shaft and in spaced relation thereto. A chain and sprocket structure 26 operatively connects the shaft 22 with the axle shaft 16 so that these shafts will rotate in the same direction, the former at a faster rate of speed than the latter. A pan 27 is supported below the frame formed by bars 11, 12 and 13 by means of links 28. This pan is guided by an elongated vertical loop structure 29 rising from the pan and straddling the side bar 13 as is clearly illustrated in Figure 4. It is to be noted that the curved guide bars 14 and 15 are mounted on the front end of the pan by suitable means as at 30. A spring 31 is engaged with the axle shaft 6 and the rear end of the pan as is clearly shown in Figure 2 and urges the pan forwardly, thereby maintaining the chain of the chain and sprocket mechanism 26 in a taut condition. It will be desirable, from time to time, to adjust the height of the beater drum A and this is accomplished by means of connecting a chain 34 with the forward portion of the pan and providing a bellcrank lever 35 on the bar 10′ alongside of the bar 10 so that the bellcrank lever may be rocked forwardly for lowering the pan or rocked rearwardly for raising the pan at the forward end thereof.

Suitable detent means 36 is mounted on the lever 35 to engage a toothed rack 37 so that the lever may be held in its different adjusted positions. A suitable seat shank 38 may be engaged on the bar 10′ to support a seat 39.

It is thought that the construction, utility, operation, and advantages of this invention will now be clearly understood by those skilled in this art without a more detailed description thereof. The present embodiment of the invention has been disclosed in detail merely by way of examples since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. An apparatus of the class described comprising a wheeled frame, a pan below the wheeled frame, flexible means for supporting the pan below the frame, a rotatable beater structure mounted forwardly of the pan, means for mounting the beater structure on the pan, a chain and sprocket structure operatively connecting the beater drum with the wheels of the frame, and spring means for urging the pan forwardly to properly tension the chain of the chain and sprocket mechanism.

2. An apparatus of the class described comprising a wheeled frame, a pan below the wheeled frame, flexible means for supporting the pan below the frame, a rotatable beater structure mounted forwardly of the pan, means for mounting the beater structure on the pan, a chain and sprocket structure operatively connecting the beater drum with the wheels of the frame, and spring means for urging the pan forwardly to properly tension the chain of the chain and sprocket mechanism, and means for raising and lowering the forward end of the pan.

3. An apparatus of the class described comprising a wheeled frame, a pan below the wheeled frame, flexible means for supporting the pan below the frame, a rotatable beater structure mounted forwardly of the pan, means for mounting the beater structure on the pan, a chain and sprocket structure operatively connecting the beater drum with the wheels of the frame and spring means for urging the pan forwardly to properly tension the chain of the chain and sprocket mechanism, and means for raising and lowering the forward end of the pan, said beater drum comprising a shaft, a spoke structure radiating from the shaft, cross bars on the spoke structure, and curved guide bars projecting forwardly from the pan, bearings on the guide bars for receiving the shaft.

4. An apparatus of the class described comprising a wheeled frame, a pan below the wheeled frame, flexible means for supporting the pan below the frame, a rotatable beater structure mounted forwardly of the pan, means for mounting the beater structure on the pan, a chain and sprocket structure operatively connecting the beater drum with the wheels of the frame, and spring means for urging the pan forwardly to properly tension the chain of the chain and sprocket mechanism, a vertical elongated rigid loop rising from the pan and straddling a portion of the frame to prevent side swinging of the pan.

In testimony whereof I affix my signature.

CLIFFORD H. SNOW.